Patented Aug. 4, 1953

2,647,891

UNITED STATES PATENT OFFICE 2,647,891

VISCOSE RECOVERY

Ryland Royster Warburton, Richmond, Va., assignor to E. I. du Pont de Nemours and Company, Wilmington, Del., a corporation of Delaware No Drawing. Application September 26, 1949, Serial No. 117,940

6 Claims. (Cl. 260—218)

This invention relates to viscose recovery and more particularly to the recovery of green viscose from a filter press and recombining this recovered viscose with new viscose to produce a very satisfactory solution for spinning or casting.

Viscose as prepared and delivered from the mixer is very "green" and normally it takes days of ripening to bring down the salt index (see Reinthaler & Rowe "Artificial Silk," p. 68—1929 edition) to the correct level for spinning into filaments or casting into sheets. During this period the viscose undergoes several stages of filtration. The first filtration removes most of the insufficiently xanthated cellulose and/or gels and other impurities that would cause trouble and because of the large removal of undesirable portions from the viscose the filter press must be redressed frequently and a very considerable amount of viscose is lost each time.

This redressing of the first stage filter press is costly of viscose in that the dressings and filter press cavities hold considerably more than 1,000 lbs. of viscose which is conventionally discarded. Further, replacement of expensive filter dressings and the pollution of streams or the necessity of neutralizing the solution, with attendant difficulties due to precipitation of cellulose, all add additional costs. A single viscose rayon plant producing at the rate of 10,000,000 lbs. of yarn per year may lose as much as 1,500,000 lbs. of viscose per year in cleaning first stage filter presses.

In spite of this very considerable loss no serious attempt has been made to alleviate this burden because it has long been considered undesirable and impracticable to use the viscose held back in the filter. It was assumed that this viscose was heavily charged with undesirable gels and/or impurities and if recovered and mixed with another viscose batch, it would only cause the filter to plug more quickly, thereby greatly increasing the frequency of changing filter press dressings. Further, a batch of viscose is a continually chemically changing mass and time involved in handling a batch is an important factor. Considerable care must be exercised to avoid improper salt indices. The industry has, therefore, continued to discard all this viscose over the years so sure were technologists that this tremendous fraction was unsuited to use.

It is, therefore, an object of this invention to provide for the recovery and use of this heretofore wasted viscose. A further object of this invention is to provide for the use of this recovered viscose while maintaining the quality and physical properties of the regenerated cellulose products made therefrom. These and other objects will be more apparent from the description that follows.

This invention comprises direct washing of the filter press with water under relatively high pressure and using these washings, i. e., the effluent from the filter press, as the make-up water for a subsequent mixer charge. The water is forced through the dressing in the same direction normally used for filtering the viscose so that the contaminants removed by the filtration process remain on or in the filter medium.

A common plate filter press containing 31 plates is covered with 30 double dressings consisting of (for first stage filtration) the following layers (1) sheeting (2) flannel (3) cotton batting and (4) sheeting. When the filter throughput drops to a point where redressing is necessary, it was found that the total amount of viscose lost was about 1,300 lbs; 150 to 600 lbs. being held in the dressings and the balance between the plates and in the connections. A rayon plant producing 10,000,000 lbs. of yarn annually has about 4 such presses, each of which must be redressed at least once every 24 hours.

In an attempt to recover this viscose, air was first blown through the press but due to its great fluidity it soon channeled through removing only a very small fraction of the viscose. Subsequently, it was found that water brought to the normal inlet side of the press under pressure of at least 50 lbs./sq. in. and preferably 70 lbs. to 120 lbs./sq. in. would wash most of the viscose through with it. For instance, direct washing of the press with 4,000 lbs. of water removed about 80% or about 1,040 lbs. of the viscose therefrom, while passing 7,000 lbs. of water through removed 95% or about 1,230 lbs. of the viscose.

In a preferred method a 30-cloth press is washed with 834 gallons of soft water at 12° C. There is provided thereby 7076 lbs. of recovered viscose solution analyzing 0.92% sodium hydroxide and 1.07% cellulose. The recovered solution weighs about 8.485 lbs./gal. Three such washings are blended in a receiving tank. Recovered solution is then drawn out into a measuring pot and transferred to a vissolver. in such an amount that no additional water need be added to the vissolver. Caustic and xanthate are then added. For example, to 7076 lbs. of recovered viscose solution are added 974 lbs. of 24% caustic and 2339 lbs. of xanthate. The resultant viscose is then used in normal procedures to form yarn, for example.

In order to supply the desired amount of water to the press a meter valve may be provided which can be preset to the required amount and will automatically shut off when this amount of water has been delivered. This amount is preferably the exact quantity of water required for mixing with the xanthate and caustic required for the next mixer charge. The water may come from any convenient source. It is preferred to use soft water, since variations in impurities which may affect viscosity and index control are avoided by using a softened water. The temperature of the water is not critical. While higher and lower temperatures may be used, a temperature of from 10° C. to 20° C. is preferred. At higher temperatures ripening is accelerated and at lower temperatures additional refrigeration costs are required.

At the recovery stage the viscose is very green and has a common salt index of about 8. As such and being very dilute, the solutions cannot be used practically to form films, fibers, etc. However, this recovered viscose and the water with which it is mixed may be immediately used in admixture with the next mixer charge with caustic soda to dissolve a freshly prepared charge of cellulose xanthate. This newly prepared charge of viscose will be somewhat larger than normal due to the recovered viscose therein but otherwise the charge is normal and will be satisfactory for use when suitably ripened. However, it is generally preferred to blend this charge with several other charges in accordance with normal viscose blending procedures, after which it is passed on to the ripening tanks. Generally, since it is preferred to have the presses in action, the viscose is recovered within about 3 hours, although this is not essential. It may stand for some time prior to recovery and after recovery it may stand 8 hours or more in the dilute solution. For efficiency, delays are usually avoided.

Filtration of the viscose containing the recovered viscose was normal and the throughput of the filters was not changed. The yarn subsequently spun from this viscose was of normal quality with the same physical properties as previously obtained. This is true also for other shaped articles.

To illustrate the comparison of yarn properties a viscose containing 7% cellulose and 6% caustic in the normal manner (Control) and a similar viscose was prepared in accordance with this invention using recovered viscose solution (Test). Then yarns and cords were prepared from each under identical conditions. In the table below are given average figures for varying properties:

| Article | Denier | Ten. (g./d.) | | | Percent E | | |
|---|---|---|---|---|---|---|---|
| | | Dry | Wet | Loop | Dry | Wet | Loop |
| Test Yarn | 1664 | 3.50 | 2.19 | 2.58 | 10.9 | 20.8 | 6.7 |
| Control Yarn | 1664 | 3.50 | 2.20 | 2.57 | 10.9 | 20.2 | 6.8 |
| Test Cord | 3735 | 3.20 | | | 11.8 | | |
| Control Cord | 3737 | 3.18 | | | 12.2 | | |

The cords were 1650/2 cords twisted 11.2(Z) in singles and 10.8(S) in plying. In fatigue tests (repeated 1.7% elongations at 360 cycles per minute at 65° C., 7% R. H.) the control ran an average of 10.3 hours and the test cords ran an average of 11.2 hours. In heat aging (6 hours in air at 150° C.) the test cords lost 36.8% strength as compared to 36% loss for control cords. From the above it can be seen that the properties of articles obtained from viscose prepared by this invention are equal to corresponding properties of articles prepared from conventional viscose.

By means of this invention over 90% of the viscose heretofore lost in first stage filtration, which was about 1% or more of all the viscose produced, is recovered. Stream pollution or other expensive neutralization treatment of the waste is avoided. The old filter dressings, having been quite well washed in the press, can be removed much more easily and, with no viscose dripping from them, house cleaning is remarkably improved and safe working conditions more readily maintained.

Any departure from the procedure described herein which conforms to the principles of the invention is intended to be included within the scope of the claims below.

I claim:
1. A process for converting viscose entrained in a filter press to a viscose solution capable of being employed in the production of shaped articles which comprises forcing said unfiltered viscose through said filter press by forcing water through the filter press containing said unfiltered viscose; collecting the resultant filtered dilute viscose solution and dissolving therein sodium hydroxide and cellulose xanthate.

2. A process for converting viscose entrained in a filter press to a viscose capable of being employed in the production of shaped articles which comprises forcing the said unfiltered viscose through said filter press by forcing water through said filter press; collecting the resultant dilute viscose solution and dissolving therein sodium hydroxide and cellulose xanthate to form a concentrated solution of viscose.

3. A process for converting viscose entrained in a filter press to a viscose capable of being employed in the production of shaped articles which comprises forcing water under a pressure of 50 lbs. to 120 lbs. per square inch through said filter press containing said unfiltered viscose, thereby forcing said unfiltered viscose through said filter press; collecting the resultant dilute viscose solution and dissolving therein sodium hydroxide and cellulose xanthate to form a concentrated solution of viscose.

4. A process for converting viscose entrained in a filter press to a viscose capable of being employed in the production of shaped articles which comprises forcing soft water at a temperature of 10° C. to 20° C. and under pressure of 50 lbs. to 120 lbs. per square inch through filter press containing said unfiltered viscose; collecting the resultant filtered dilute viscose solution and dissolving therein sodium hydroxide and cellulose xanthate to form a concentrated solution of viscose.

5. A process for converting viscose entrained in a filter press to a viscose capable of being employed in the production of shaped articles which comprises forcing water through a filter press containing said unfiltered viscose, thereby forcing said unfiltered viscose through said filter press; collecting the resultant filtered dilute viscose solution; blending a number of said dilute viscose solutions and dissolving in the resultant blend sodium hydroxide and freshly prepared cellulose xanthate to form a concentrated viscose.

6. A process for converting viscose entrained in a filter press to a viscose capable of being employed in the production of shaped articles which comprises filtering viscose through a press containing about 30 filter cloths; forcing any unfiltered viscose through said press by forcing about 834 gal. of soft water at 12° C. through the said press; repeating said washing about 3 times to obtain thereby about 7076 lbs. of dilute filtered viscose solution; adding to said dilute solution about 974 lbs. of 24% caustic and about 2339 lbs. of cellulose xanthate to obtain thereby a concentrated viscose.

RYLAND ROYSTER WARBURTON.

References Cited in the file of this patent

UNITED STATES PATENTS

| Number | Name | Date |
|---|---|---|
| 1,032,091 | Sweetland | July 9, 1912 |
| 1,221,554 | McCaskell | Apr. 3, 1917 |
| 2,159,676 | Richter et al. | May 23, 1939 |
| 2,484,013 | Calhoun | Oct. 11, 1949 |
| 2,492,421 | Golben | Dec. 27, 1949 |
| 2,513,652 | Kline | July 4, 1950 |
| 2,523,977 | Wagner et al. | Sept. 26, 1950 |

FOREIGN PATENTS

| Number | Country | Date |
|---|---|---|
| 620,919 | Great Britain | Mar. 31, 1949 |

OTHER REFERENCES

Ott: "Cellulose and Cellulose Derivatives," 1943, pages 818, 819.